No. 655,267. Patented Aug. 7, 1900.
A. OBERMEYER.
MACHINE TOOL FOR PUNCHING, STAMPING, &c.
(Application filed Feb. 3, 1900.)
(No Model.) 3 Sheets—Sheet 1.
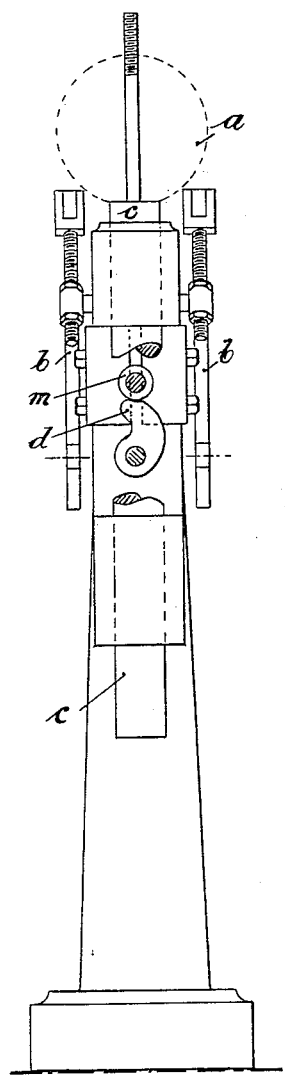
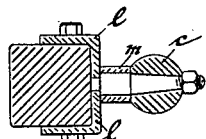
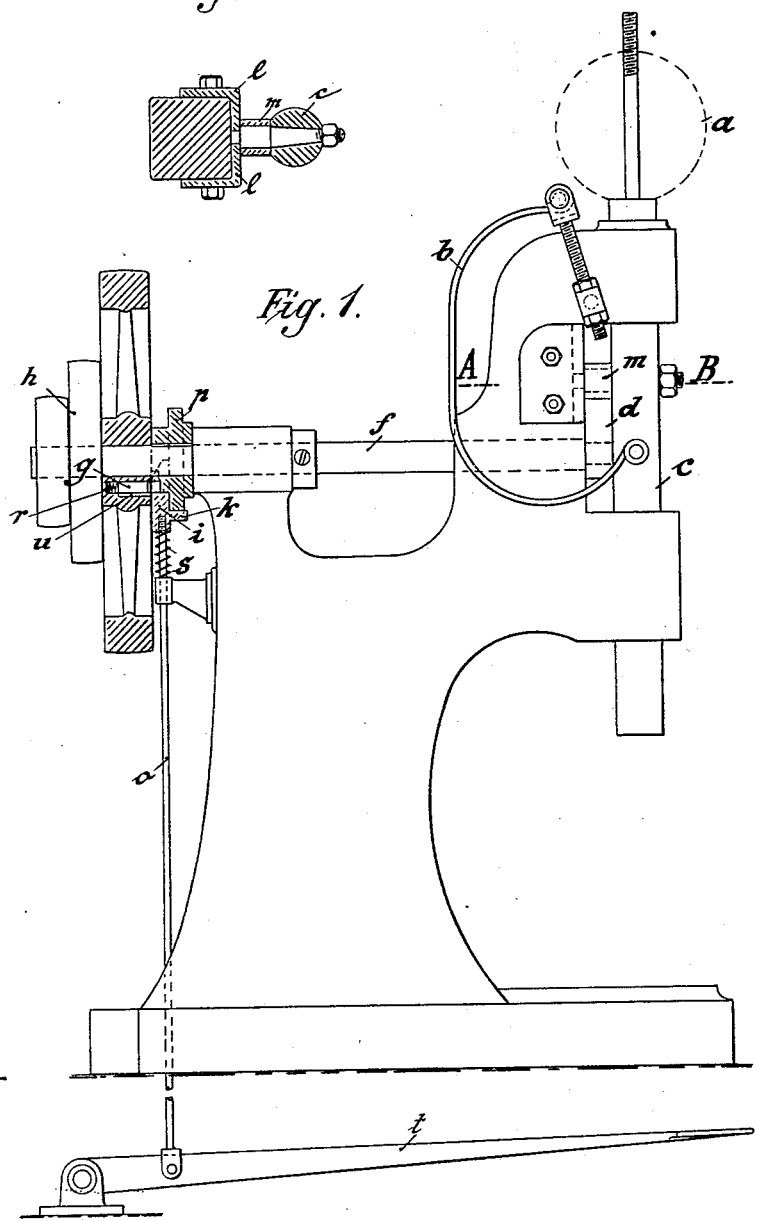

No. 655,267. Patented Aug. 7, 1900.
A. OBERMEYER.
MACHINE TOOL FOR PUNCHING, STAMPING, &c.
(Application filed Feb. 3, 1900.)
(No Model.) 3 Sheets—Sheet 2.
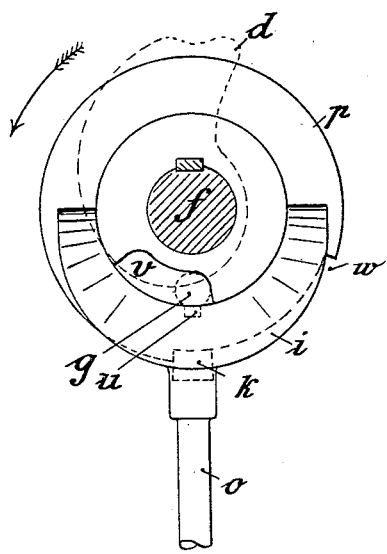
Fig. 4.
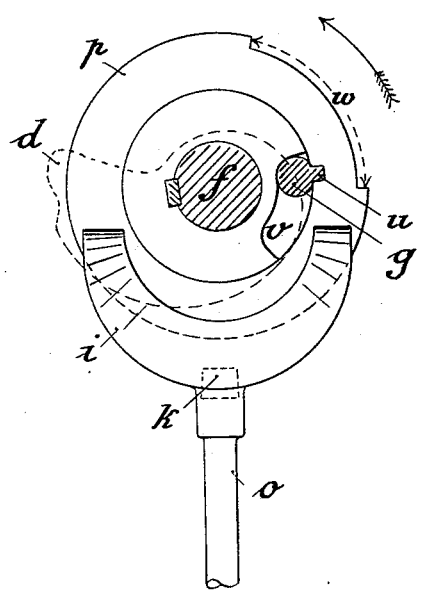
Fig. 5.
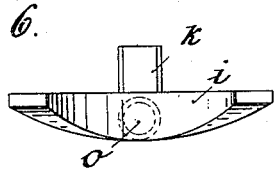
Fig. 6.
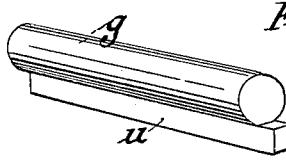
Fig. 5ª.
Witnesses:
Inventor:
Alexander Obermeyer
by Eustace H. Hopkins
Atty.

No. 655,267. Patented Aug. 7, 1900.
A. OBERMEYER.
MACHINE TOOL FOR PUNCHING, STAMPING, &c.
(Application filed Feb. 3, 1900.)
(No Model.) 3 Sheets—Sheet 3.

Witnesses:
Inventor:

UNITED STATES PATENT OFFICE.

ALEXANDER OBERMEYER, OF BARMEN-RITTERSHAUSEN, GERMANY.

MACHINE-TOOL FOR PUNCHING, STAMPING, &c.

SPECIFICATION forming part of Letters Patent No. 655,267, dated August 7, 1900.

Application filed February 3, 1900. Serial No. 3,884. (No model.)

*To all whom it may concern:*

Be it known that I, ALEXANDER OBERMEYER, a subject of the King of Prussia, German Emperor, residing at Barmen - Rittershausen, Germany, have invented certain new and useful Improvements in Machine-Tools for Punching, Stamping, and the Like, of which the following is a full, clear, and exact description.

The present invention relates to machine-tools for hammering, punching, stamping, and the like; and it consists of the details of construction hereinafter set forth, and particularly pointed out in the claims.

The objects of the invention are to provide means for always arresting the punching or stamping tool, which is of the vertically-reciprocating class, in its highest position, and, further, to provide means for increasing the force of the downward stroke of the tool-carrier bar in any desired measure, according to the nature of the work being done.

In order to render the present specification easily intelligible, reference is had to the accompanying drawings, in which similar letters of reference denote similar parts throughout the several views.

Figure 7:
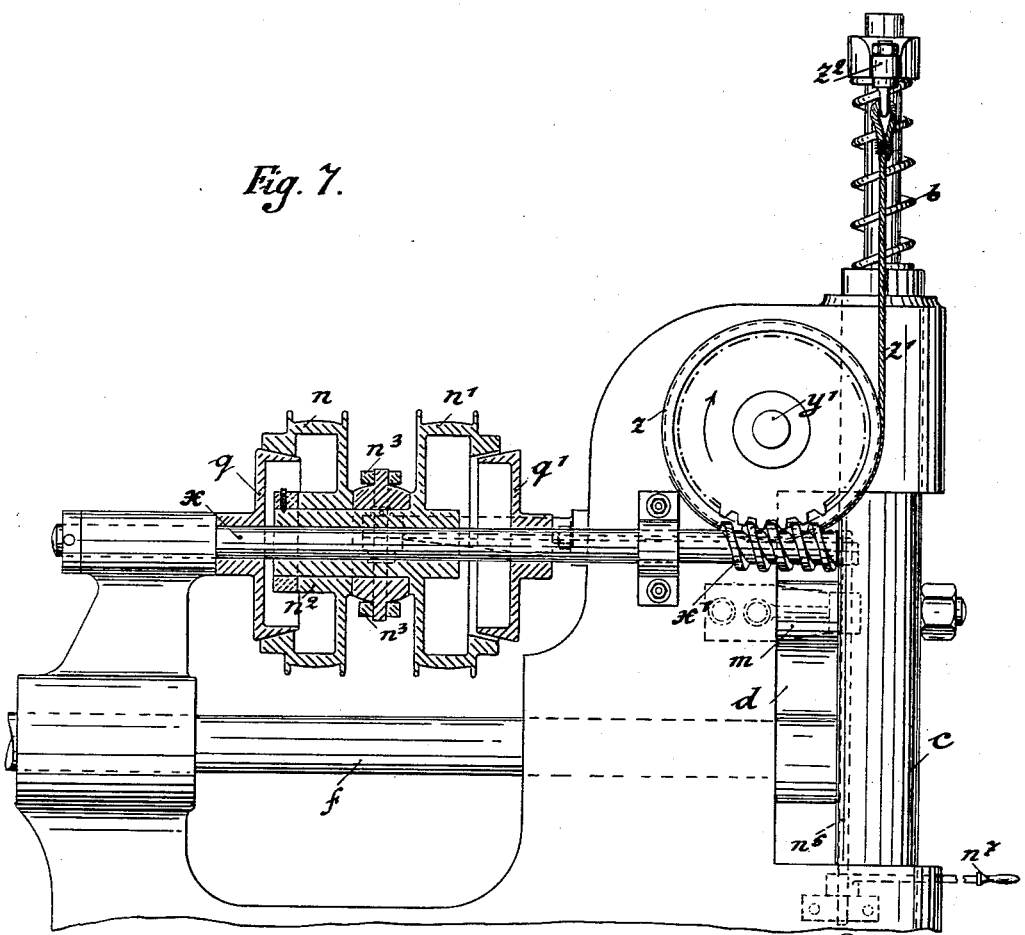
Figure 8:
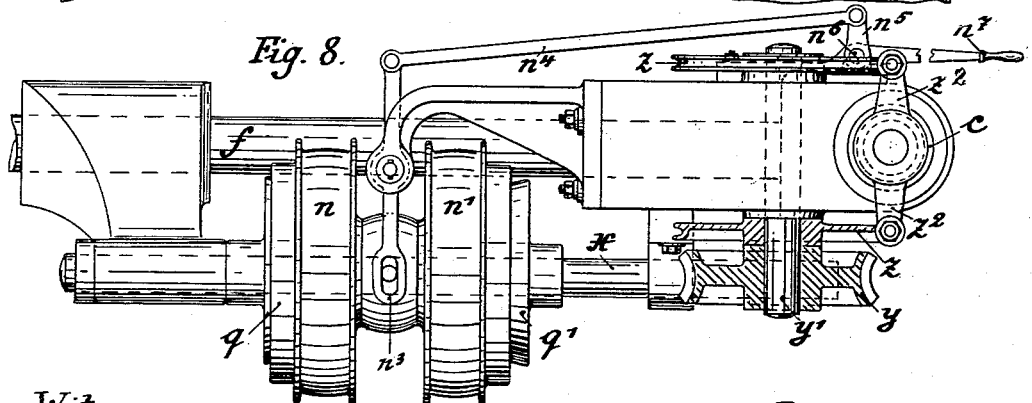

Figure 1 is a side elevation of a machine-tool provided with the improved arresting device. Fig. 2 is a front elevation of the same; Fig. 3, a section on line A B of Fig. 1; Fig. 4, a face elevation of the coupling device; Fig. 5, a similar elevation showing the coupling mechanism out of engagement. Fig. 5ª is a detail view of a coupling-pin, and Fig. 6 a top view of the coupling cam-fork. Fig. 7 is a side elevation, partly in section, of the machine provided with means for increasing the blow of the tool at will; and Fig. 8 is a plan of the same machine. Figs. 4, 5, and 6 are drawn to a larger scale.

Referring to Figs. 1 to 6, the vertically-reciprocating bar $c$, carrying the punching or stamping tool or hammer, is normally depressed either by means of the pair of springs $b$, which effect the blow, or by the weight $a$. (Indicated in dotted lines at Fig. 1.) The bar is raised by a cam $d$, fast to the shaft $f$, which carries the combined driving-pulleys and fly-wheel $h$, loosely mounted thereon and adapted to be coupled in a peculiar manner, hereinafter set forth, to the coupling-disk $p$, which is fast on the shaft $f$. The bar is raised by means of the roll $m$, mounted on a pin in the said bar $c$ and running on the disk or cam $d$, the pin of the said roll being prolonged somewhat beyond the roll and engaging in a vertical guideway formed by the adjacent edges of two angle-irons $e$ $e$, (see Fig. 3,) so as to insure the exact vertical reciprocation of the tool-bar $c$.

The coupling-disk $p$ is provided with a laterally-extending boss, against which the fork $i$, mounted at the upper end of the rod $o$, is normally pressed by means of a spring $s$, Fig. 1. The coupling will be best seen from Figs. 1, 4, 5, and 6. The coupling-fork $i$ is tapered in the vertical plane, as will be seen from Fig. 6, and acts as a wedge or cam to operate a laterally-movable coupling-pin $g$, mounted in the fly-wheel $h$ and normally pressed toward the coupling-disk $p$ by means of a small spring $r$. The cam-surface of the fork $i$, when the latter is in its raised position, acts against a lateral lug $u$, formed on the head of the pin $g$, Fig. 5ª, pressing the said pin back into its seat in the fly-wheel and out of engagement with the slot $v$ of the coupling-disk $p$. When the fork is in its downward position, Fig. 5, the spring $r$ of the pin $g$ pushes the latter out, so that as the fly-wheel rotates it will come into engagement with the arc-shaped slot $v$ of the coupling-disk $p$ and cause the same, and with it the shaft $f$ and cam $d$, to rotate and operate the tool-bar. Now in order to arrest the tool-bar in its highest position each time the same is placed out of action the disk $p$ is provided with a peripheral depression $w$, Fig. 5, and the coupling-fork $i$ has a laterally-extending lug $k$, which when the fork is raised comes into the depression $w$, and the impetus of the shaft $f$ at the moment of uncoupling will cause the disk $p$ to rotate until the lug $k$ lies at the end of the depression $w$, in which case the bar $c$ will be arrested in its highest position. The part of the cam $d$ corresponding to the highest position of the tool-bar is advantageously provided with a slight depression into which the roll $m$ will sink when the cam comes around, and thus offer a slight resistance to its further rotation, which slight resistance would only come into effect after the shaft $f$ had been uncoupled. The fork-rod $o$ is operated to cause the coupling of the parts by means of a pedal $t$ or any other suitable lever arrangement.

The device operates in the following manner: Normally the coupling is disengaged, the spring $s$ holding the coupling-fork up in position to press back the coupling-pin $g$. When the pedal is depressed, the fork is withdrawn from the position shown at Fig. 4 to that of Fig. 5, and as the fly-wheel revolves the cam-fork will have no effect on the pin $g$, which, as it comes around, will fall into engagement with the slot $v$ and rotate the shaft $f$. As soon as the pedal $t$ is released the spring $s$ raises the fork $i$, its cam-surface engages the lug $u$ of the pin $g$, forcing the latter back, so that the disk $p$ will be uncoupled. At the same time it will be arrested in the position shown at Fig. 4 by the lug $k$, and as the fly-wheel $h$, with the pin, revolves each time the pin comes around it will be prevented from engagement with the recess $v$, which lies behind or within the bifurcation of the fork $i$, by the cam-surface of the latter acting on the said lug. During its revolution on the face of the disk $p$ not covered by the lug the latter will slide on the said face; but as soon as it comes within the reach of the recess $v$ the cam-surface of the fork acts to retain it from engagement, as will be readily understood on reference to Fig. 4.

This device—i. e., the means for arresting the tool-carrying bar in its highest position—has a double advantage. First, the impetus of the shaft $f$ is least when the bar $c$ has attained its highest position against the operation of the bar-depressing spring or weight, and, second, when the machine or bar is again started the tendency of the said bar is to descend under the influence of its spring or weight, so that the restarting is facilitated. Thus shocks will be avoided in both cases, in that the arrest of the mechanism takes place at the moment at which the impetus is the least, while the release after arrest takes place at the most favorable moment—viz., when the bar is ready to fall.

The second part of the invention relates to the means for varying the force of the downstroke of the tool-carrying bar.

Referring to Figs. 7 and 8, the bar $c$ is normally depressed by the spring $b$, and the degree of tension of the said spring is determined by the cross-head $z^2$, against which it rests. This cross-head is movable on the upper part of the said bar and controlled in its movements by a pair of cords or wires $z'$, wound on pulleys $zz$, mounted on a transverse shaft $y'$. This shaft carries, furthermore, attached thereto a worm-wheel $y$, in which a worm $x'$ engages, said worm being carried by or formed on a shaft $x$ mounted in suitable bearings. This shaft $x$ is capable of movement or rotation by means of two coupling-disks $q\ q'$, fast thereon. Between the said coupling-disks a sleeve is mounted loosely on the said shaft, said sleeve carrying two belt-pulleys $n\ n'$, fast thereon, and each having a clutch adapted to engage the coupling-disks $q\ q'$, according to the position of the said sleeve on the shaft. One of the pulleys is provided with an open belt and the other with a crossed one. The sleeve is operated longitudinally of the shaft by means of a lever $n^3$, pivotally mounted and operated by a lever $n^4$ from an angle-lever $n^5\ n^7$, pivotally mounted at $n^6$, said angle-lever being provided with a handle by means of which it may be operated to shift the coupling of the pulleys $n\ n'$.

The device is manipulated in the following manner: If it is desired to increase the force of the downward stroke of the bar $c$, the lever $n^7$ is turned to effect the coupling of the sleeve-pulley to operate the worm-wheel $z$ in the direction of the arrow in Fig. 7, so that a pull will be exercised on the wires or cords $z'$ to pull the cross-head $z^2$ down and increase the pressure of the spring $b$. If a lighter stroke is required, the lever is moved in the opposite direction, while if the sleeve is in the middle, between the two coupling-disks, the spring will operate with its accustomed or normal force.

By the above-described device it is possible to vary the pressure of the actuating-spring according to the work being done, the said spring-pressure being varied from the source of power driving the machine. It will be evident that the form of the spring $b$ is immaterial, as the same might be formed in the same way as those of Figs. 1 and 2 by adapting the mechanism described without departing from the spirit of the present invention.

I claim as my invention—

1. In a machine-tool having a vertically-reciprocating tool-carrying bar and means for normally depressing the same and a cam device to raise it, the combination of means for arresting the bar, when the machine is stopped, in its highest position immaterial of the position of the parts at the moment of uncoupling, substantially as described.

2. In a machine of the class specified, the combination of a vertically-reciprocating tool-carrying bar, means for depressing the same, and a rotary cam to raise the same, a cam-shaft for the cam and means for driving the same and a coupling-disk, a laterally-projecting pin rotated by the driven shaft and a recess in which said pin may engage in the coupling-disk, a coupling-fork having cam-surfaces and a laterally-projecting lug, and a depression in the periphery of the said coupling-disk in which the said lug engages when the fork is in its upper position said depression being located so that when the cam is supporting the tool-carrying bar in the highest position the lug will be engaged by its end in the manner and for the purpose substantially as described.

3. In a machine of the class specified the combination of a vertically-reciprocating tool-carrying bar, means for depressing the same and means for raising the same consisting of a rotary cam, a depression in the top of said cam into which the tool-bar roll, coöperating with said cam may sink and effect a slight resistance when the bar is in its highest position and means for uncoupling the driving mechanism and for arresting the cam-shaft in its said highest position substantially as described.

4. In a machine of the class specified having a spring to depress the tool-carrying bar, and a cross-head against which the said spring bears, the combination of a shaft having two coupling-disks and a double coupling-clutch mounted therebetween having an open and a closed belt, cords attached at either side to the said spring cross-head and guided over suitable pulleys, gearing between said pulleys and the said shaft carrying the couplings and means for operating the said couplings to rotate the shaft in either direction at the fall of the tool-carrying bar substantially as described.

5. In a machine of the class specified, the combination of a vertically-reciprocating tool-carrying bar and a spring to normally depress the same and cam to raise it, a cross-head to determine the pressure of the said spring and means in connection with the machine-driving gear to vary the position of the said cross-head at any period of the working of the said machine substantially as described.

In witness whereof I have hereunto set my hand in presence of two witnesses.

ALEXANDER OBERMEYER.

Witnesses:
OTTO KÖNIG,
J. A. RITTERSHAUS.